United States Patent [19]

Millar

[11] 4,296,026

[45] Oct. 20, 1981

[54] PRODUCTION OF SOYBEAN PROTEIN ISOLATE OF IMPROVED PURITY

[75] Inventor: Donald B. Millar, Toronto, Canada

[73] Assignee: General Foods Inc., Toronto, Canada

[21] Appl. No.: 189,646

[22] Filed: Sep. 22, 1980

[51] Int. Cl.³ .............................................. A23J 1/14
[52] U.S. Cl. ................. 260/123.5; 426/656; 426/657
[58] Field of Search ............... 260/123.5; 426/656, 426/657

[56] References Cited

U.S. PATENT DOCUMENTS

| | | | |
|---|---|---|---|
| 4,169,090 | 9/1979 | Murray et al. | 260/123.5 X |
| 4,208,323 | 6/1980 | Murray et al. | 260/123.5 X |
| 4,247,573 | 1/1981 | Murray et al. | 260/123.5 X |

*Primary Examiner*—Howard E. Schain
*Attorney, Agent, or Firm*—Sim & McBurney

[57] ABSTRACT

The purity of soybean protein isolate obtained by collecting protein from an aqueous protein dispersion formed by extraction of the protein from soybeans with aqueous sodium chloride solution and dilution of the protein solution, optionally after concentration of the protein content thereof, is improved by the inclusion of millimolar concentrations of calcium chloride in the aqueous sodium chloride solution.

8 Claims, No Drawings

PRODUCTION OF SOYBEAN PROTEIN ISOLATE OF IMPROVED PURITY

FIELD OF INVENTION

The present invention relates to the isolation of proteins from soybeans.

BACKGROUND TO THE INVENTION

In U.S. Pat. Nos. 4,169,090 and 4,208,323, the disclosures of which are incorporated herein by reference, both assigned to the assignee of this application, there are described procedures for isolating protein from protein source materials by contacting the protein source material with sodium chloride solution under critical pH and ionic strength conditions to solubilize the protein, and diluting the protein solution with water to a lower ionic strength to cause the formation of protein aggregates in the aqueous phase which settle and are collected as an amorphous protein micellar mass. The protein solution may be subjected to ultra-centrifugation prior to the dilution step and the steeling may be enhanced by centrifugation.

When this procedure is applied to the isolation of protein from soybeans, the soybean isolate is in a substantially undenatured form in contrast to soy isolates which are formed by the conventional isoelectric precipitation procedure, which are substantially denatured. The isoelectric precipitation procedure involves extracting the protein under highly alkaline pH conditions and acidifying the protein extract to the isoelectric point.

SUMMARY OF INVENTION

It has now surprisingly been found that the incorporation of a small amount of calcium chloride in the sodium chloride solution used in the protein extraction step in the protein isolation procedures of U.S. Pat. Nos. 4,169,090 and 4,208,323 results in a significantly improved purity of soybean isolate, while at the isolate substantially unaffected.

GENERAL DESCRIPTION OF INVENTION AND DESCRIPTION OF PREFERRED EMBODIMENTS

The initial step of the process of this invention involves solubilization of the protein in the soybeans. The soybean usually are in a defatted comminuted form. Defatting may be effected by any convenient technique to prevent interference by the oil with the protein extraction. The average particle size of the comminuted material may vary widely, generally between about 10 and about 800 mesh, preferably less than about 200 mesh.

A food grade salt solution is used in the protein solubilization. In the prior art processes of U.S. Pat. Nos. 4,169,090 and 4,208,323 mentioned above, the food grade salt used usually comprised sodium chloride, althogh mention is made therein of using other food grade salts, such as, potassium chloride or calcium chloride. In the present invention, sodium chloride provides the bulk of the ionic strength of the food grade salt solution and a small amount of calcium chloride also is present to provide the remainder of the ionic strength. The presence of the calcium chloride increases the purity of isolate which is attained, when compared to the use of sodium chloride alone.

The food grade salt solution has an ionic strength of at least about 0.2 molar to enable solubilization of significant quantities of protein to be effected. In view of the greater degree of dilution required with increasing ionic strength, it is usually preferred to utilize an ionic strength value less than about 0.8 molar, and more preferably a value of about 0.3 to about 0.6 molar.

The food grade salt solution used in the extraction step contains sodium chloride and calcium chloride. The quantity of calcium chloride is that which is at least effective to increase the purity of the soybean isolate which is ultimately recovered. The quantity of calcium chloride used is less than that which significantly decreases the yield of isolate. The quantities of calcium chloride used are millimolar concentrations.

The improvement in isolate purity is attained in the presence of as little as about 0.001 molar calcium chloride and the improved purity is maintained over a range of concentrations of up to about 0.01 molar or more. Preferably, a calcium chloride concentration of about 0.002M to about 0.005M is used since an increased yield of isolate also is observed in this range, typically about 0.005M in an 0.5M ionic strength solution.

It had previously been obxerved that when calcium chloride is used alone as the food grade salt for solubilization of the protein, a metallic taste was imparted to the isolate. No such metallic taste has been detected for the isolates which are produced by the process of the invention despite the presence of calcium chloride in the extraction medium.

The solubilization of the soybean protein is effected at a temperature of about 15° to about 75° C. preferably up to about 65° C. since any improvement in extraction yield attained above this temperature is often at least partially offset by a degree of denaturation of the protein, the solubilization is preferably accompanied by agitation to decrease the solubilization time, which is usualy about 10 to about 60 minutes. It is preferred to effect the solubilization to extract substantially the maximum amount of protein from the source material.

The lower temperature limit of about 15° C. is chosen since solubilization is impractically slow below this temperature while the upper temperature of about 75° C. is chosen since substantial denaturation of the protein can occur above this temperature.

The concentration of soybean in the aqueous solution during the solubilization step may vary widely, and is typically within the range of about 5 to about 15% w/v.

When no adjustment of pH values is contemplated, the aqueous solution of sodium chloride containing millimolar concentrations of calcium chloride has a pH of about 5 to about 6.8, preferably about 5.3 to 6.2.

As described in detail in copending U.S. patent application Ser. No. 189,644 filed concurrently herewith in my name and assigned to the assignee of this application, the disclosure of which is incorporated herein by reference, the pH at which maximum solubilization of protein occurs differs from the pH at which the maximum yield of isolate is attainable upon dilution.

The procedure set forth in that application may be adopted with advantage in this invention to improve the yield. Accordingly, the aqueous food grade salt solutions used in the initial protein solubilization have a pH of about 5.6 to about 7, preferably about 5.6 to about 5.9. The pH of the protein solution then is adjusted, following concentration when such a procedure is adopted, to a value within the range of about 4.8 to about 5.4, preferably about 4.9 to about 5.1, using any desired food grade acid, such as, hydrochloric acid.

When the protein extraction operation has been effected, the protein solution is separated from solid phase extracted soybean material. The resulting protein solution, usually having a protein concentration of about 10 to about 100 g/l, preferably about 30 to about 70 g/l, then may be concentrated, in accordance with the procedure of U.S. Pat. No. 4,208,323, to increase the concentration thereof while maintaining the ionic strength thereof substantially constant.

Any such concentration step may be effected by any convenient selective membrane technique, such as, ultrafiltration. The degree of concentration of the protein solution can be termed the "concentration factor" or more properly "volume reduction factor".

A volume reduction factor of at least 1.1 usually is used and values above about 5.0 to 6.0 are usually avoided since processing difficulties result from the high viscosity of the protein solution. It is preferred to use a volume reduction factor of about 3.0 to 4.0.

The concentration may be effected at any convenient temperature, typically about 20° to about 75° C., and for the period of time to effect the desired degree of concentration. The temperature and other conditions used to some degree depend upon the membrane equipment used to effect the concentration.

The concentrated protein solution resulting from the concentration step, generally having a protein concentration of about 40 to about 200 g/l, depending on the initial protein concentration and the volume reduction factor used, is diluted to a lower ionic strength value less than about 0.2 molar, preferably to a value less than about 0.15 molar, and more preferably to an ionic strength in the range of about 0.06 to about 0.12 molar. When the concentration step is omitted, the protein solution is diluted to an ionic strength value less than about 0.1 molar.

The dilution of the protein solution or the concentrated protein solution generally is effected by passing the concentrated protein solution into a body of water having the volume required to achieve the ionic strength decrease. This body of water usually has a temperature of less than about 25° C. and preferably has a temperature of about 5° to about 15° C., since improved yields of protein isolate are attained with these colder temperatures.

The decrease in ionic strength causes the formation of a protein dispersion which is allowed to settle to form a coalesced dense amorphous sticky protein isolate mass. The settling may be induced, such as, by centrifugation.

The settled soy isolate, in the form of an amorphous, sticky protein mass, termed "protein micellar mass", or PMM, is separated from the aqueous phase. The PMM may be used in the wet form or may be dried by any convenient technique, such as, spray drying, freeze drying or vacuum drum drying, to a dry form.

The soybean protein isolate which is formed by the procedure of the invention is substantially undenatured, which gives rise to improved functional characteristics when compared with the isoelectrically-precipitated soy isolates.

The isolate has a higher purity, based on the protein content as determined by Kjeldahl nitrogen (TKN)×5.71, than that produced in the absence of the calcium chloride. The higher purity of the soy isolate produced by the process of the invention gives rise to lower viscosity aqueous dispersions at the same protein concentrations and utility in meat and dairy analog formulations where low carbohydrate content is desirable.

EXAMPLES

EXAMPLE 1

This Example illustrates the improvement in purity of soybean isolate which is attained in the presence of millimolar concentrations of calcium chloride.

Defatted ground soyabean meal having a protein content (TKN×5.71) of 49.4% was extracted using an aqueous extract solution of 0.5 molar ionic strength at 10% w/v and 35° C. for 30 minutes, in 30 g samples at pH 5.80 and 5.90 and in 20 g samples at pH 5.30. The ionic strength of the aqueous extract solution was provided in part by varying concentrations of calcium chloride and the balance by sodium chloride.

After separation of the aqueous extract solution from the residual solid phase, 180 ml of the extract solution was diluted into 720 ml of water, i.e., a dilution ratio of 4:1. The aqueous dispersion of protein aggregates which resulted was settled and the settled amorphous protein mass was dried.

The purity of isolate along with the yield of isolate were determined for each run and the results are reproduced in the following Table I:

TABLE I

| Concentration of Salts in Extraction Medium | | % Protein in Product (TKN × 5.71) pH | | | Process Yield % pH | | |
|---|---|---|---|---|---|---|---|
| NaCl M | CaCl$_2$ | 5.30 | 5.60 | 5.90 | 5.30 | 5.60 | 5.90 |
| 0.5 | 0 | 87.6 | 87.4* | 85.3 | 49.1 | 49.3 | 45.5 |
| 0.494 | 0.002 | 87.5 | 93.8 | 88.5 | 49.1 | 50.1 | 46.5 |
| 0.485 | 0.005 | 94.1 | 93.6 | 87.4 | 52.9 | 51.3 | 45.0 |
| 0.470 | 0.010 | 92.7 | 95.6 | 91.0 | 50.2 | 50.1 | 45.0 |
| 0.440 | 0.02 | 100.6 | 95.8 | 93.5 | 43.6 | 45.1 | 45.4 |
| 0.380 | 0.04 | 99.9 | 97.5 | 94.5 | 43.7 | 43.6 | 44.8 |

Note: *Average of two runs - 86.2 and 88.5

The results of the above Table I show that in all cases a significantly increased purity of isolate was obtained in the presence of millimolar concentrations of calcium chloride. Small increases in process yield were observed at low concentrations of calcium chloride, but at higher concentrations a significant decrease in yield is observed in the case of extractions at pH 5.30 and pH 5.60

EXAMPLE II

This Example illustrates the effect of a pH adjustment in the presence of millimolar concentrations of calcium chloride.

Defatted ground soybean meal having a protein content (TKN×5.71) of 49.4 wt.% was extracted on a pilot plant scale using an aqueous extraction medium containing 0.5M NaCl and 0.005M CaCl$_2$ at pH 6.3 at 10% w/v and 45° C. for 30 minutes. 11.35 kg of soybean meal was extracted with 113.5 liters of extraction medium. After separation of the aqueous extract isolation from the residual solid phase, the extract solution was concentrated 4.0 times on a hollow-fibre ultrafiltration unit.

150 ml samples of the concentrated solution were adjusted in pH using hydrochloric acid to a series of pH values down to pH 4.5 and the samples were separately diluted into 750 ml of cold (10° C.) tap water to form a turbid suspension of protein aggregates. The dispersions were settled by centrifugation at 5000 xg for 10 minutes.

The process yield was determined in each case, and the results are outlined in the following Table II:

TABLE II

| Adjusted pH of Concentrated Protein Solution | Process Yield (%) |
| --- | --- |
| 5.8 | 34.8 |
| 5.6 | 35.2 |
| 5.4 | 36.6 |
| 5.2 | 49.2 |
| 5.1 | 46.9 |
| 5.0 | 66.1 |
| 4.9 | 48.8 |
| 4.8 | 49.7 |
| 4.7 | 51.6 |
| 4.5 | 36.4 |

The results of the above Table II show a significantly increased yield of isolate is attainable by pH adjustment in the presence of calcium chloride.

SUMMARY OF DISCLOSURE

In summary of this disclosure, the present invention relates to a novel procedure for the recovery of soybean isolate in improved purity. Modifications are possible within the scope of the invention.

What I claim is:

1. In a process for the formation of a soybean protein isolate by contacting soybeans with an aqueous sodium chloride solution of ionic strength of at least about 0.2 molar to solubilize the protein, diluting the protein solution to an ionic strength sufficient to form a protein dispersion of protein in the aqueous phase, and collecting the protein from the dispersion as an amorphous mass of soybean protein isolate, the improvement which comprises using calcium chloride in said aqueous sodium chloride solution in an amount effective to increase the purity of said soybean protein isolate.

2. The process of claim 1 wherein said calcium chloride is used in a concentration of about 0.001 to about 0.01M.

3. The process of claim 2 wherein said calcium chloride is used in a concentration of about 0.002 to about 0.005M.

4. The process of claim 1, 2 or 3 wherein said soybeans are contacted with said aqueous sodium chloride solution at a temperature of about 15° to about 75° C. at a pH of about 5.5 to 6.3 and the protein solution resulting from said contact is diluted to an ionic strength of less than about 0.1 molar to form the protein dispersion.

5. The process of claim 1, 2 or 3 wherein said soybeans are contacted with said aqueous sodium chloride solution at a temperature of about 15° to about 75° C. at a pH of about 5 to about 6.8, the protein concentration of the protein solution resulting from said contact is increased while the ionic strength thereof is maintained substantially constant, and the concentrated solution is diluted to a lower ionic strength below about 0.2 molar to form the protein dispersion.

6. The process of claim 1, 2 or 3 wherein said soybeans are contacted with said aqueous sodium chloride solution at a pH of about 5.6 to about 7 and the pH of the protein solution is adjusted to a value in the range of about 4.8 to about 5.4 prior to said dilution.

7. The process of claim 6 wherein said contact pH is about 5.6 to about 5.9 and said adjusted pH is about 4.9 to about 5.1.

8. The process of claim 7 wherein said pH adjustment is effected using hydrochloric acid.

* * * * *